(12) United States Patent  
Nakao et al.

(10) Patent No.: US 7,663,719 B2  
(45) Date of Patent: Feb. 16, 2010

(54) LIQUID CRYSTAL DISPLAY PANEL

(75) Inventors: Kenji Nakao, Kanazawa (JP); Shinji Ogawa, Ishikawa-gun (JP); Yoshinori Yamamoto, Kanazawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 563 days.

(21) Appl. No.: 11/387,940

(22) Filed: Mar. 24, 2006

(65) Prior Publication Data

US 2006/0164583 A1    Jul. 27, 2006

Related U.S. Application Data

(63) Continuation of application No. PCT/JP2004/13924, filed on Sep. 24, 2004.

(30) Foreign Application Priority Data

Sep. 26, 2003  (JP) .............. 2003-335515  
May 28, 2004  (JP) .............. 2004-159656

(51) Int. Cl.  
    *G02F 1/1337* (2006.01)
(52) U.S. Cl. ..................... 349/123; 349/124
(58) Field of Classification Search .......... 349/123–132  
    See application file for complete search history.

(56) References Cited

U.S. PATENT DOCUMENTS 5,946,066 A * 8/1999 Lee et al. ................. 349/141

| | | | |
|---|---|---|---|
| 6,338,713 B1 * | 1/2002 | Chamoun et al. | 600/300 |
| 6,642,982 B2 * | 11/2003 | Chung et al. | 349/123 |
| 7,145,621 B2 * | 12/2006 | Lee et al. | 349/141 |
| 7,548,297 B2 * | 6/2009 | Shigemura et al. | 349/153 |
| 2005/0264738 A1 | 12/2005 | Nakao et al. | |
| 2005/0264739 A1 | 12/2005 | Nakao et al. | |

FOREIGN PATENT DOCUMENTS

| | | | |
|---|---|---|---|
| JP | 2-22624 | | 1/1990 |
| JP | 9-244040 | | 9/1997 |
| JP | 10-268311 | | 10/1998 |
| JP | 10-333150 | | 12/1998 |
| JP | 2003-295191 | | 10/2003 |
| JP | 2003-335515 | | 11/2003 |
| JP | 2004-159656 | | 6/2004 |
| KR | 2004036953 | * | 5/2004 |

OTHER PUBLICATIONS

U.S. Appl. No. 11/693,178, filed Mar. 29, 2007, Nakao, et al.

* cited by examiner

*Primary Examiner*—Julie-Huyen L Ngo  
(74) *Attorney, Agent, or Firm*—Oblon, Spivak, McClelland, Maier & Neustadt, L.L.P.

(57) ABSTRACT

A liquid crystal display panel structured such that a liquid crystal layer is held between paired electrode substrates, comprises a support base member of a nearly rectangular shape provided in at least one of the paired electrode substrates, a counter electrode supported by the support base member, and an alignment film which is located within a surface of the counter electrode in contact with the liquid crystal layer. The rubbing direction of the alignment film is parallel to one side of the support base member and the counter electrode has a nonlinear edge extending in the rubbing direction of the alignment film.

26 Claims, 9 Drawing Sheets

LIQUID CRYSTAL DISPLAY PANEL

CROSS-REFERENCE TO RELATED APPLICATIONS

This is a Continuation Application of PCT Application No. PCT/JP2004/013924, filed Sep. 24, 2004, which was published under PCT Article 21(2) in Japanese.

This application is based upon and claims the benefit of priority from prior Japanese Patent Applications No. 2003-335515, filed Sep. 26, 2003; and No. 2004-159656, filed May 28, 2004, the entire contents of both of which are incorporated herein by reference.

BACKGROUND OF THE INVENTION

1. Field of the Invention

The present invention relates to a liquid crystal display panel in which an alignment film is located on a counter electrode supported by a support base member of a nearly rectangular shape and the rubbing direction of the alignment film is parallel to one side of the support base member.

2. Description of the Related Art

Liquid crystal display panels have been extensively used in personal computers, car navigation systems, TV monitors, etc., to display images. Liquid crystal (LCD) modes of the liquid crystal display panels generally include the TN mode and the STN mode, which utilize nematic liquid crystals. Further, an LCD mode is also known which uses ferroelectric liquid crystals or the like and which is high in response speed and wide in viewing angle; however, improvements in the resistance to mechanical shock, temperature characteristics and so on are required. In contrast to the LCD modes in which liquid crystal molecules are twist aligned, the optically compensated bend (OCB) mode is an LCD mode in which liquid crystal molecules are aligned parallel. This mode has attracted attention as being suitable for video equipment for displaying moving images because it is excellent in high-speed response and wide in viewing angle. For this reason, the OCB-mode liquid crystal display panels have been developed actively.

As with the other modes, the OCB-mode liquid crystal display panel has a structure such that a liquid crystal layer is held between an array substrate and a counter substrate which are a pair of electrode substrates. An alignment film is provided on each of the counter substrate and the array substrate in order to control the alignment of OCB liquid crystal molecules.

FIG. 15 shows a rubbing treatment which is performed on the alignment film AL of the counter substrate CT in the manufacturing process of an OCB-mode liquid crystal display panel. In the counter substrate CT, the alignment film AL is located on the counter electrode CE, which is made of indium tin oxide (ITO) or the like and supported by a support base member GL of a nearly rectangular shape. The edges of the counter electrode CE are inside those of the support base member GL and the edges of the alignment film AL are inside those of the counter electrode CE. In the rubbing treatment, a stage SG moves in the X direction together with the counter substrate CT placed on it as shown in FIG. 15. A rubbing roller RL is set in a slanting direction crossing the X direction at an angle and rotates around its axis together with a rubbing cloth BF wound onto it. The counter substrate CT is placed on the stage SG such that the two long sides of the support base member GL are oriented parallel to the rubbing roller RL and the two short sides are oriented perpendicular to the roller RL. The rubbing roller RL performs rubbing on the alignment film AL while the counter substrate CT moves under the rubbing roller RL. Here, the rubbing cloth BF rubs the alignment film AL in the Y direction perpendicular to the rotation axis of the rubbing roller RL in a state where it is in contact with the alignment film AL. That is, the rubbing direction of the alignment film AL is parallel to the short sides of the support base member GL. With the counter electrode CT and rubbing roller RL slanted as described above, the pile of the rubbing cloth BF is not irregularly deformed and makes the rubbing uniform. If the rubbing roller RL were perpendicular to the direction of movement of the counter substrate CT (the X direction), the pile of the rubbing cloth BF would be deformed so as to be divided to both sides, producing a valley in the rubbing cloth BF. The alignment film AL would not be sufficiently rubbed in this valley portion, thus causing nonuniformity in rubbing. To attain uniform rubbing, therefore, the rubbing roller RL is slanted not to form a right angle with the direction of movement of the counter electrode CT. Such a rubbing treatment is likewise performed on the alignment film of the array substrate as well.

Incidentally, the uniformity in rubbing significantly affects the display quality of the liquid crystal display panel. Non-uniform rubbing would cause nonuniformity in display in display operations. For example, the direction of movement of the counter substrate CT relative to the rubbing direction, the movement speed of the counter substrate CT and the rotational speed of the rubbing roller RL are factors which determine the uniformity in rubbing.

For example, Japanese Unexamined Patent Publication No. 10-186364 (patent document 1) and Japanese Unexamined Patent Publication No. 10-268311 (patent document 2) disclose techniques to solve the nonuniformity in display. The patent document 1 describes imposing restrictions on the direction in which piles are arranged and the angle of each electrode on the substrate relative to the rotating direction of the rubbing roller at rubbing time in order to solve the nonuniformity in rubbing resulting from the behavior of the pile of the rubbing cloth of the rubbing roller. The patent document 2 describes adjusting the relationship between the rotational speed of the rubbing roller and the moving speed of the substrate at rubbing time in order to solve the nonuniformity in rubbing due to the eccentricity of the rubbing roller.

However, the patent documents 1 and 2 do not take into consideration problems unique to the OCB mode caused by the rubbing treatment. In the TN and STN modes, only low pretilt angles are required. In contrast, in the OCB mode, high pretilt angles are required to stably transfer liquid crystal molecules from a splay alignment to a bend alignment. This is because the bend alignment becomes unstable if the pretilt is low.

In adjusting the alignment of liquid crystal molecules in the rubbing treatment, it is inevitable that the alignment state scatters (varies) to some degree, depending on the manufacturing process. In the OCB mode, since the pretilt is high, the influence of the manufacturing process appears as a much larger difference in pretilt angle than in the TN and STN modes. This large difference in pretilt angle forms the main factor of display nonuniformity on the display screen. If the nonuniformity in pretilt angle were large in the OCB mode, a change in intermediate-gradation display voltage would cause a large change in transmittance, resulting in remarkable nonuniformity in display. Thus, in a mode in which high pretilt is required, like the OCB mode, high uniformity is required.

The inventors considered variations in pretilt angle which cause remarkable display nonuniformity in the OCB mode. When the rubbing cloth BF of the rubbing roller RL shown in FIG. 15 comes into contact with one edge of the counter electrode CE which extends in the Y direction, the pile of the rubbing cloth BF suffers damage with the electrode edge. In general, the counter electrode CE is made of ITO. The ITO edge has an acute step. Rubbing parallel to this step causes the pile of a portion of the rubbing cloth BF to abrade and break and causes slices of the pile to stick to other peripheral portions in the rubbing cloth BF. The area thus damaged forms a spiral trace of damage as the counter substrate CT moves and the rubbing roller RL rotates. When rubbed by such a rubbing cloth BF, that portion of the alignment film AL which faces the damaged area will not be rubbed sufficiently. Thereby, stripe-like defects DF resulting in shortage of rubbing will be formed at regular intervals on the alignment film Al. The trace of damage cannot be ignored because it accumulates with displacement each time the rubbing treatment is repeated. In FIG. 15, the stripe-like defects DF form a nearly triangular area on the alignment film AL of the counter substrate CT passed under the rubbing roller RL. The nearly triangular area is nonuniform in the rubbing state, which results in variations in the alignment state of liquid crystals in the liquid crystal layer, i.e., variations in pretilt angle. Although the stripe-like defects DF cannot be confirmed by observing the alignment film AL, they are observed as display nonuniformity on image display after the completion of assembly of the liquid crystal display panel.

When the pile of the rubbing cloth BF rubs the edge of the alignment film AL adjacent to the edge of the counter electrode CE, a portion of the alignment film AL may peel off to get into the rubbing cloth BF as a particle in a position PT shown in FIG. 16. In that case, the particle would further damage the rubbing cloth BF. In addition, the particle would damage the surface of the alignment film AL facing the rubbing cloth BF each time the rubbing roller RL makes one rotation. For example, if the rotational axis of the rubbing roller RL is at 30° relative to the direction perpendicular to the direction of movement of the counter substrate CT (the X direction), the rubbing roller RL makes one rotation in 0.1 seconds, and the counter substrate CT moves 2 mm in 0.1 seconds, then stripe-like defects DF due to damage will be formed at a pitch of 1 mm on the alignment film AL as shown in FIG. 16.

BRIEF SUMMARY OF THE INVENTION

It is an object of the present invention to provide a liquid crystal display panel which allows the uniformity of liquid crystal alignment to be increased by suppressing stripe-like defects of an alignment film caused by a rubbing treatment.

According to the present invention, there is provided a liquid crystal display panel structured such that a liquid crystal layer is held between paired electrode substrates, which comprises a support base member of a nearly rectangular shape provided in at least one of the paired electrode substrates, an underlayer supported by the support base member, and an alignment film located within a surface of the underlayer in contact with the liquid crystal layer, wherein the rubbing direction of the alignment film is parallel to one side of the support base member, and the underlayer has a nonlinear edge extending in the rubbing direction of the alignment film.

With the liquid crystal display panel, the underlayer has a nonlinear edge extending in the rubbing direction of the alignment film. For this reason, since the length of time that the edge of the underlayer is in contact with a specific portion of a rubbing roller in the treatment of rubbing the alignment film is short, the abrasion of the rubbing cloth occurring in that specific portion is lightened. As a result, the occurrence of stripe-like defects of the alignment film resulting from the abrasion of the rubbing cloth can be suppressed to improve the uniformity of liquid crystal alignment and obtain good display quality. The nonlinear edge may be formed into a zigzag shape such as a bending shape, a saw-tooth shape, a mixed shape of a bending shape and a saw-tooth shape, or a wave-like shape including curves. When the bending shape is comprised of a plurality of linear partial edges which are arranged continuously so that adjacent partial edges make opposite angles with an axis parallel to the rubbing direction, the pitch of the linear partial edges 5 is 1 to 5 mm. The absolute value of the angle each of the linear partial edges makes with the axis parallel to the rubbing direction should preferably be set to a range of 10 to 45° and more preferably to a range of 25 to 35°. Such a structure is particularly useful when the alignment film has a side parallel to the rubbing direction and suitable for OCB, ferroelectric, anti-ferroelectric, and in-plane switching (IPS) liquid crystal display panels whose alignment film has a side parallel to the rubbing direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An OCB-mode liquid crystal display panel according to a first embodiment of the present invention will be described hereinafter with reference to the accompanying drawings.

Figure 1:
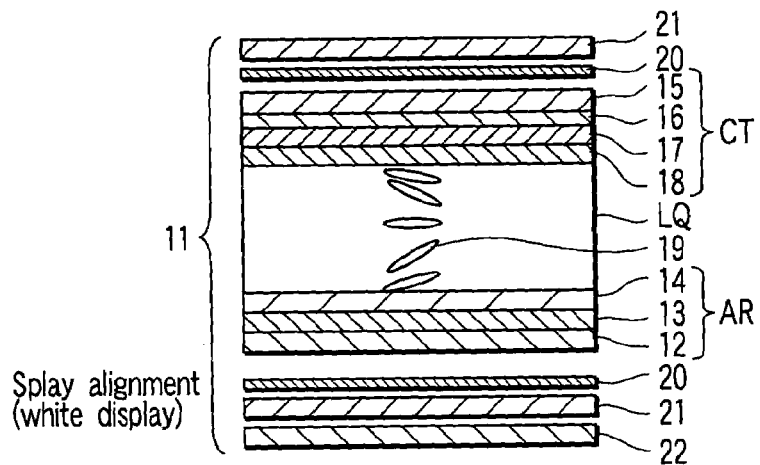
FIG. 1 schematically shows the sectional structure of an OCB-mode liquid crystal display panel according to a first embodiment of the present invention.
Figure 2:
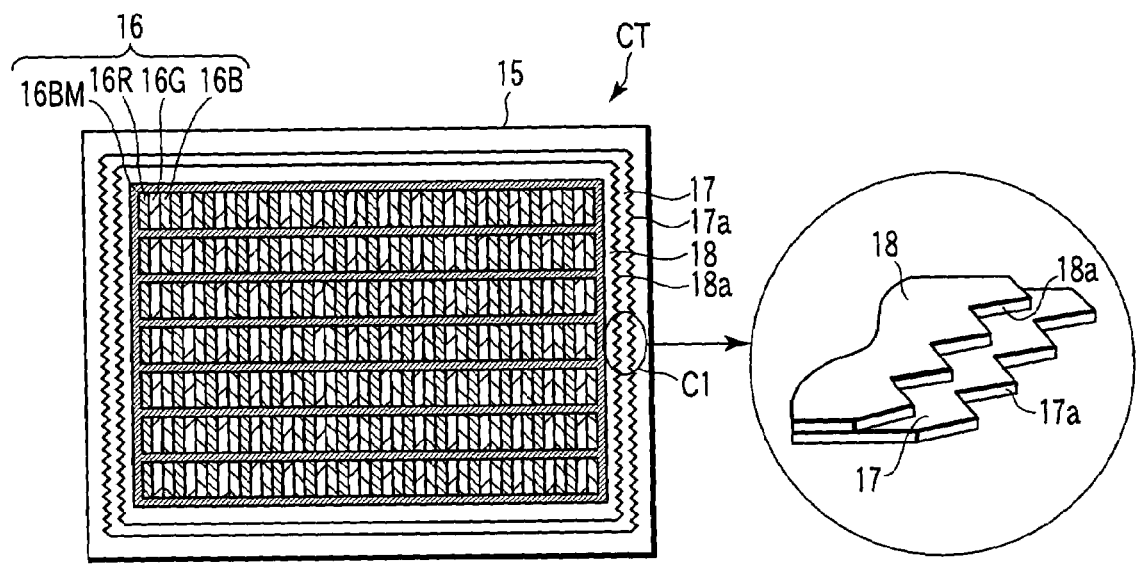
FIG. 2 shows the planar structure of the counter substrate shown in FIG. 1.

FIG. 1 shows the sectional structure of the OCB-mode liquid crystal display panel 11. FIG. 2 shows the planar structure of the counter substrate CT shown in FIG. 1. The liquid crystal display panel 11 has a structure such that a liquid crystal layer LQ is held between paired electrode substrates: an array substrate AR and a counter substrate CT.

The array substrate AR includes a support base member 12 which is formed of a glass plate or the like and is nearly rectangular or square in shape, a plurality of pixel electrodes 13 formed on the support base member 12, and an alignment film 14 formed on the pixel electrodes 13. The counter substrate CT includes a support base member 15 which is formed of a glass plate or the like and is nearly rectangular or square in shape, a color filter layer 16 formed on the support base member 15, a counter electrode 17 formed on the color filter layer 16, and an alignment film 18 formed on the counter electrode 17. The liquid crystal layer LQ is obtained by filling liquid crystals into the gap between the counter substrate 15 and the array substrate 12. The color filter layer 16 includes red-colored layers 16R for red pixels, green-colored layers 16G for green pixels, blue-colored layers 16B for blue pixels, and a black-colored (light-shielding) layer 16BM for a black matrix. In FIG. 1, liquid crystal molecules 19 are in the state of a splay alignment. In addition, the liquid crystal display panel 11 is equipped with a pair of retardation films 20 placed outside the array substrate AR and the counter substrate CT, a pair of polarizers 21 placed outside the retardation films 20, and a backlight 22 as a light source which is placed outside the polarizer 21 on the array substrate AR side.

With this OCB-mode liquid crystal display panel 11, the alignment films 14 and 18 have been rubbed in directions parallel to each other so that the liquid crystal molecules 19 are aligned in the splay alignment as shown in FIG. 1 in the initial state. In the initial state, the liquid crystal molecules 19 close to the surfaces of the alignment films 14 and 18 have a high pretilt angle of 5° or more with respect to the surfaces of the alignment films 14 and 18, specifically 5 to 12°.

The alignment state of the OCB liquid crystal molecules 19 is in the splay alignment in the initial state. Therefore, in the initialization process performed upon supply of power, a relatively strong electric field which is applied between the pixel electrodes 13 and the counter electrode 17. After the OCB liquid crystal molecules are transferred from the splay alignment to a bend alignment by the relatively strong electric field, the liquid crystal display panel performs a display operation.

Figure 3:
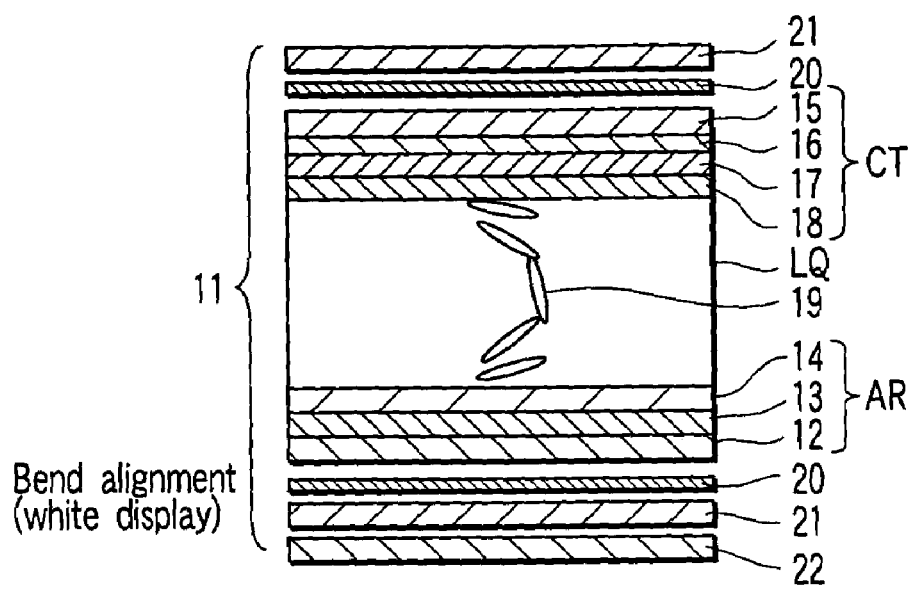
FIG. 3 shows the state in which liquid crystals shown in FIG. 1 are aligned in a bend alignment for white display.
Figure 4:
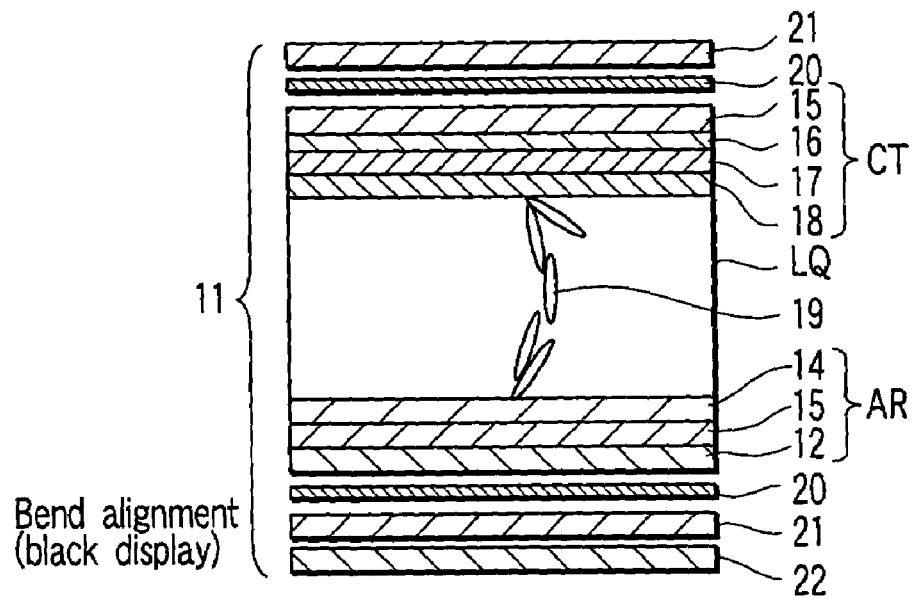
FIG. 4 shows the state in which liquid crystals shown in FIG. 1 are aligned in a bend alignment for black display.

FIG. 3 shows the state in which the liquid crystal molecules 19 are aligned in the bend alignment for white display. FIG. 4 shows the state in which the liquid crystal molecules 19 are aligned in the bend alignment for black display. The bend alignment for white display shown in FIG. 3 is obtained by applying a relatively small voltage between the pixel electrode 13 and the counter electrode 17. The bend alignment for black display shown in FIG. 4 is obtained by applying a relatively large voltage between the pixel electrode 13 and the counter electrode 17.

The transmittance for light from the backlight 22 is minimum in the bend alignment for black display and maximum in the bend alignment for white display. In the display operation, therefore, the voltage between the pixel electrode 13 and the counter electrode 17 is controlled so as to change the alignment of the liquid crystal molecules 19 between the bend alignment for black display and the bend alignment for white display, thereby obtaining transmittance values corresponding to intermediate gradations. The alignment of the liquid crystal molecules 19 may further involve twists in the bend alignment.

With this liquid crystal display panel 11, the counter electrode 17 and the alignment film 18 of the counter substrate CT are formed into such planar shapes as shown in FIG. 2. The counter electrode 17 and the alignment film 18 have nonlinear edges 17a and 18a, respectively, which extend in the rubbing direction RD of the alignment film 18. Each of the edges 17a and 18a is shaped into a zigzag along an axis parallel to the rubbing direction RD. In FIG. 2, portions of the edge 17a of the counter electrode 17 and the edge 18a of the alignment film 18 which are enclosed by a circle C1 are illustrated enlarged.

Figure 5:
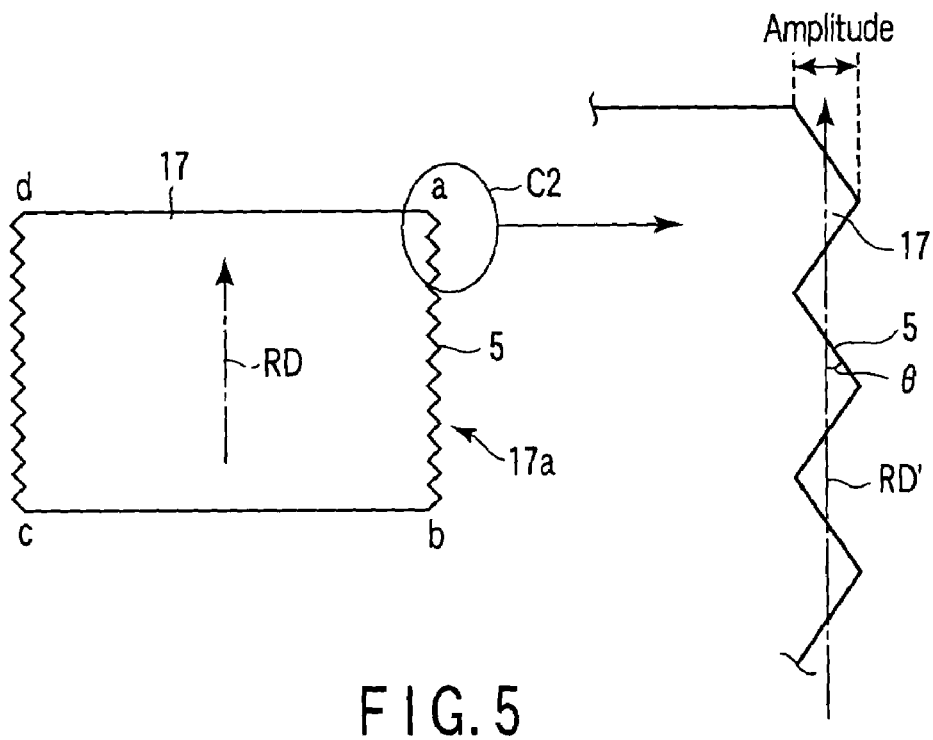
FIG. 5 shows the planar shape of the counter electrode shown in FIG. 2.

FIG. 5 shows the planar shape of the counter electrode 17. The sides ab and cd of the counter electrode 17 extend in the rubbing direction RD and the sides ad and bc extend in a direction perpendicular to the rubbing direction RD. Thus, the sides ab and cd correspond to the edge 17a shown in FIG. 2.

The edge 17a of the counter electrode 17 has a bending shape as a set of linear partial edges 5 nonparallel to the rubbing direction RD. These linear partial edges 5 are arranged continuously so that adjacent partial edges make opposite angles with an axis RD' parallel to the rubbing direction RD. In FIG. 5, that portion of the edge 17a which is enclosed by a circle C2 is shown enlarged. The pitch of the linear partial edges 5 is 1 to 5 mm. The absolute value of the angle θ each of the linear partial edges 5 makes with the axis RD' parallel to the rubbing direction RD should preferably be set to a range of 10 to 45° and more preferably to a range of 25 to 35°. The edge 18a of the alignment film 18 shown in FIG. 2 is formed into the same shape as that of the counter electrode 17 shown in FIG. 5.

Figure 15:
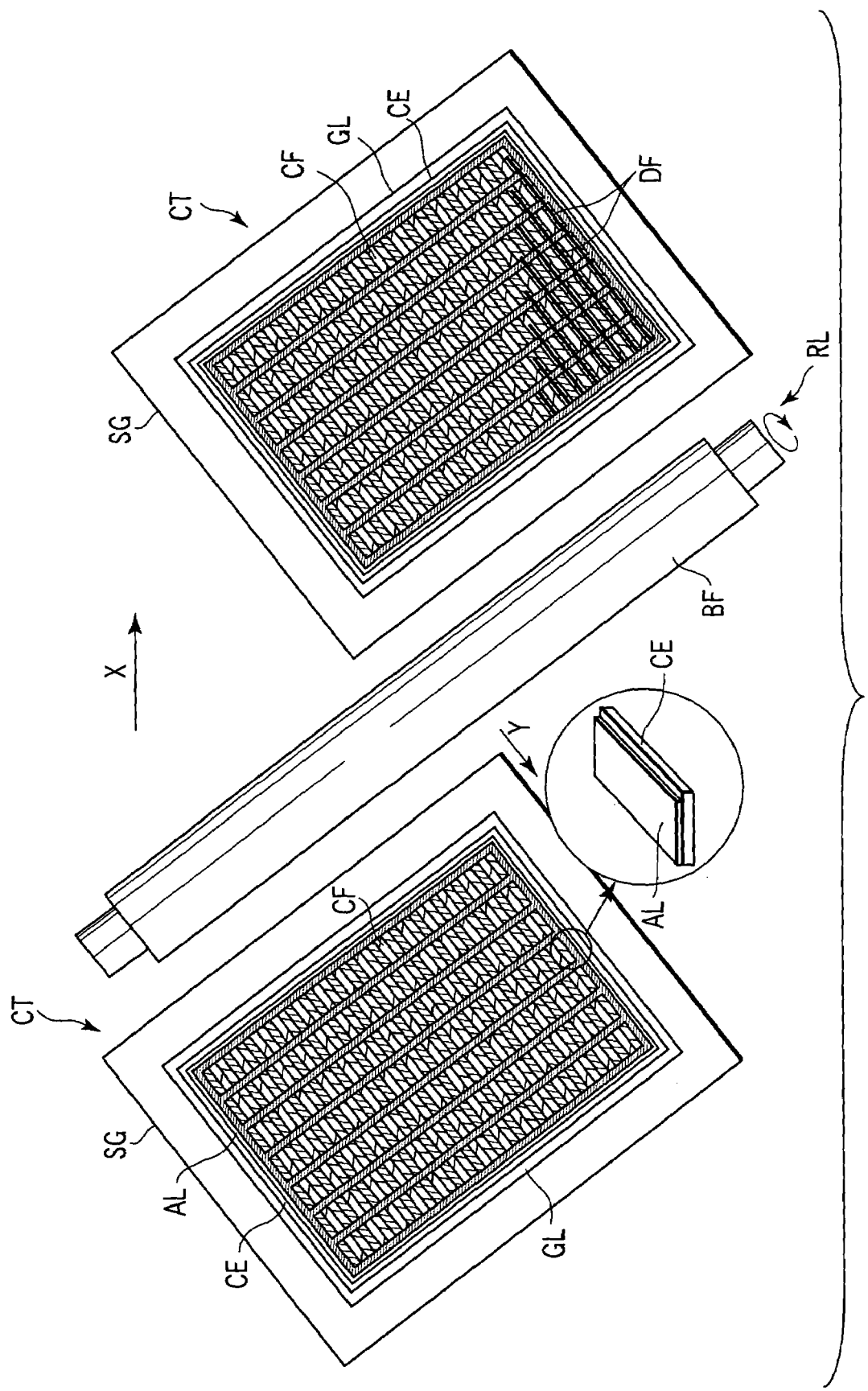
FIG. 15 is a diagram explaining the treatment of rubbing the alignment film of the counter substrate in the manufacturing process of an OCB-mode liquid crystal display panel.
Figure 16:
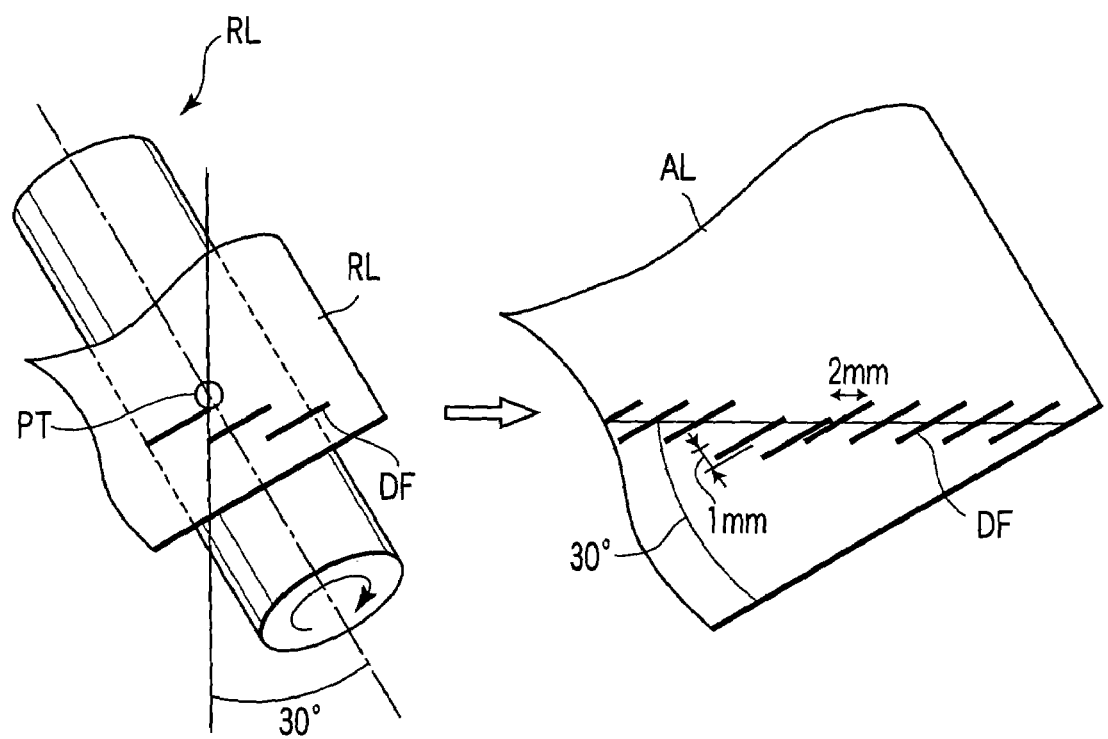
FIG. 16 is a diagram for use in explanation of stripe-like defects which occur due to a particle peeled off the alignment film in the rubbing treatment shown in FIG. 15.

With the liquid crystal display panel 11 of this embodiment, the counter electrode 17 has a nonlinear edge 17a which extends in the rubbing direction RD. Since the edge 17a of the counter electrode 17 is not parallel to the rubbing direction RD, the time contact is made at a specific portion of the rubbing roller RL is reduced in a rubbing treatment using the rubbing roller RL and described with reference to FIG. 15, allowing regular abrasion of the rubbing cloth BF to be alleviated. Rubbing parallel to the electrode edge locally abrades the pile of the rubbing cloth BF at the acute electrode edge. Therefore, touch of the rubbing cloth BF is weakened by forming the electrode edge into a zigzag and, even if abrasion occurs, uniformity is ensured by increasing the width of abrasion. In addition, the alignment film 18 has a nonlinear edge 18a which extends in the rubbing direction RD like the edge 17a of the counter electrode 17. Since the edge 18a of the alignment film 18 is not parallel to the rubbing direction RD, regular damage of the rubbing cloth BF can be alleviated in the rubbing treatment using the rubbing roller RL. Here, there may occur damage such that a portion of the alignment film 18 peels off to stick to the rubbing cloth BF and consequently the rubbing BF is locally contaminated; however, such damage is alleviated. As the result, stripe-like defects which occur in the alignment film 18 are suppressed, allowing the uniformity of alignment to be increased.

Examination of the alignment uniformity improving effect by forming the edge 17a of the counter electrode 17 and the edge 18a of the alignment film 18 into zigzag showed the following results. That is, when the edges of the counter electrode 17 and the alignment film 18 are parallel to the rubbing direction RD, the alignment failure rate due to stripe-like defects occurred in the alignment film 18 was 70%. The alignment failure rate was decreased to 50% by forming only the edge 17a of the counter electrode 17 into zigzag. Further, the alignment failure rate was decreased to approximately 0% by forming the edge 18a of the alignment film 18 as well as the edge 17a of the counter electrode 17 into zigzag. Forming only the edge 18a of the alignment film 18 into zigzag decreased the alignment failure rate to 5%.

Figure 6:
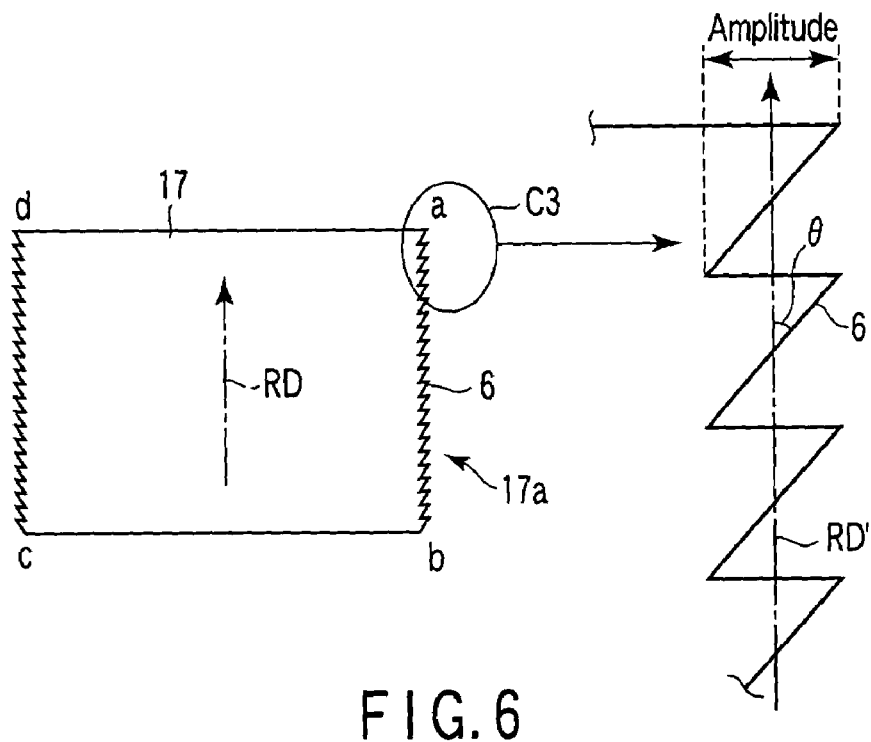
FIG. 6 shows a first modification of the planar shape of the counter electrode shown in FIG. 5.
Figure 7:
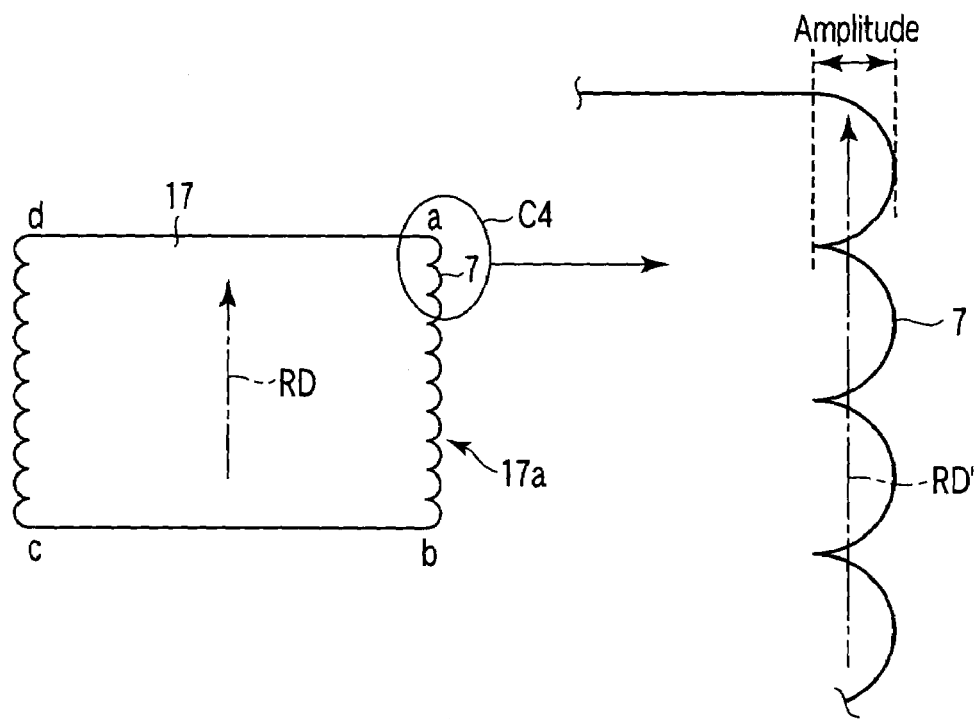
FIG. 7 shows a second modification of the planar shape of the counter electrode shown in FIG. 1.
Figure 8:
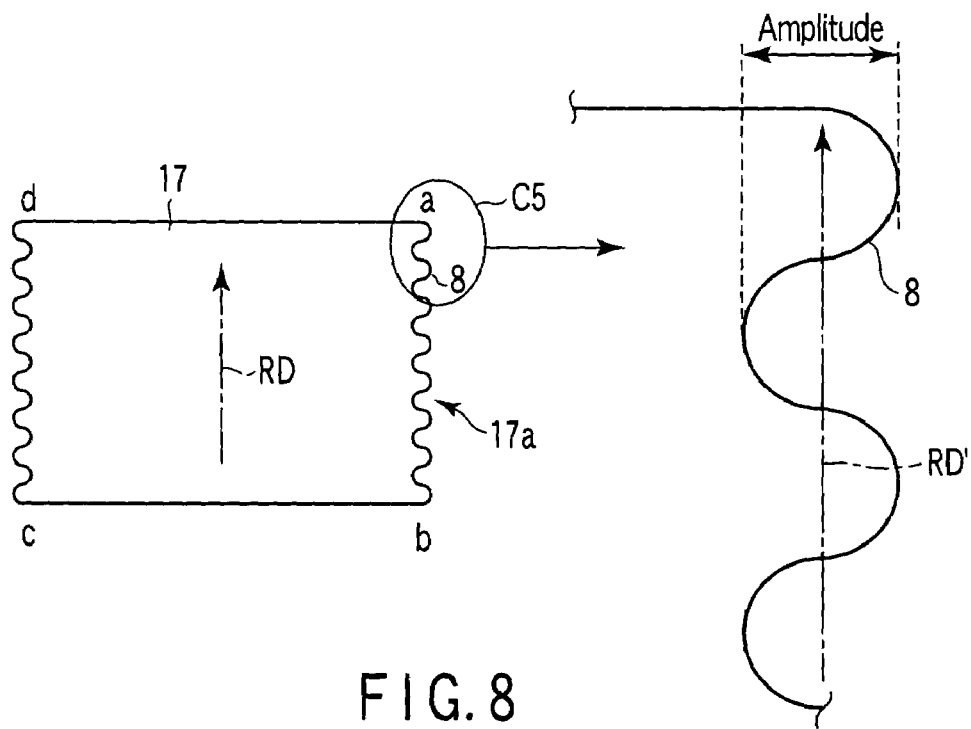
FIG. 8 shows a third modification of the planar shape of the counter electrode shown in FIG. 1.

The planar shape of the counter electrode 17 shown in FIG. 5 may be modified as shown in FIGS. 6, 7, and 8. These planar shapes shown in FIGS. 6, 7, and 8 may be applied to the alignment film 18 shown in FIG. 1.

FIG. 6 shows a first modification of the planar shape of the counter electrode 17. The edge 17a of the counter electrode 17 has a saw-tooth shape as a set of saw-toothed partial edges 6 nonparallel to the rubbing direction RD. In FIG. 6, that portion of the edge 17a of the counter electrode 17 which is enclosed by a circle C3 is shown enlarged. The absolute value of the angle θ each of the saw-toothed partial edges 6 makes with the axis RD' parallel to the rubbing direction RD should preferably be set to a range of 10 to 45° and more preferably to a range of 25 to 35°. Examination of practical angles for θ showed that approximately 30° was optimum. The angle θ does not necessarily need to be the same for all the partial edges 6.

FIG. 7 shows a second modification of the planar shape of the counter electrode 17. The edge 17a of the counter electrode 17 has a wave-like shape as a set of semi-circle-like partial edges 7 nonparallel to the rubbing direction RD. The semi-circle-like partial edges 7 are continuously arranged so that they are oriented in the same direction with respect to the axis RD' parallel to the rubbing direction RD. In FIG. 7, that portion of the edges 17a of the counter electrode 17 which is enclosed by a circle C4 is shown enlarged.

FIG. 8 shows a third modification of the planar shape of the counter electrode 17. The edge 17a of the counter electrode 17 has a wave-like shape as a set of semi-circle-like partial edges 7 nonparallel to the rubbing direction RD. The semi-circle-like partial edges 7 are continuously arranged so that adjacent partial edges are oriented in the opposite directions with respect to the axis RD' parallel to the rubbing axis RD. In FIG. 8, that portion of the edge 17a of the counter electrode 17 which is enclosed by a circle C5 is shown enlarged.

Each of the counter electrode 17 and the alignment film 18 may have edges of a sinusoidal or semi-oval shape extending in the rubbing direction RD in addition to the planar shapes shown in FIGS. 5 to 8. In addition, they may have edges of a mixed shape of a bending shape and a saw-tooth shape which extend in the rubbing direction RD.

The amplitude of the edges 17a and 18a, i.e., the width in the direction perpendicular to the axis RD', should be 0.2 mm or more, preferably 0.5 mm or more, and more preferably 0.8 mm or more. The thickness of the alignment film 18 should be less than 200 nm, preferably less than 150 nm, and more preferably less than 100 nm.

Further, the structure of this embodiment, which is particularly effective in reducing the display nonuniformity which is liable to occur in an LCD mode having a high pretilt angle of 5° or more like the OCB mode liquid crystal display panel 11, can also be applied to other LCD modes requiring the rubbing treatment, for example, IPS liquid crystal display panels, ferroelectric liquid crystal display panels and anti-ferroelectric liquid crystal display panels, in which case the effect of reducing display nonuniformity will be obtained correspondingly. It is important here that the LCD modes are ones in which rubbing is performed parallel to electrode edges, ones in which parallel rubbing is performed.

An OCB mode liquid crystal display panel according to a second embodiment of the present invention will be described hereinafter with reference to the accompanying drawings. This liquid crystal display panel remains unchanged in structure from the first embodiment except the structure of the counter substrate. For this reason, in FIG. 9 and the description which follows, corresponding elements are denoted by like reference numerals and detailed descriptions thereof are omitted or simplified.

Figure 9:
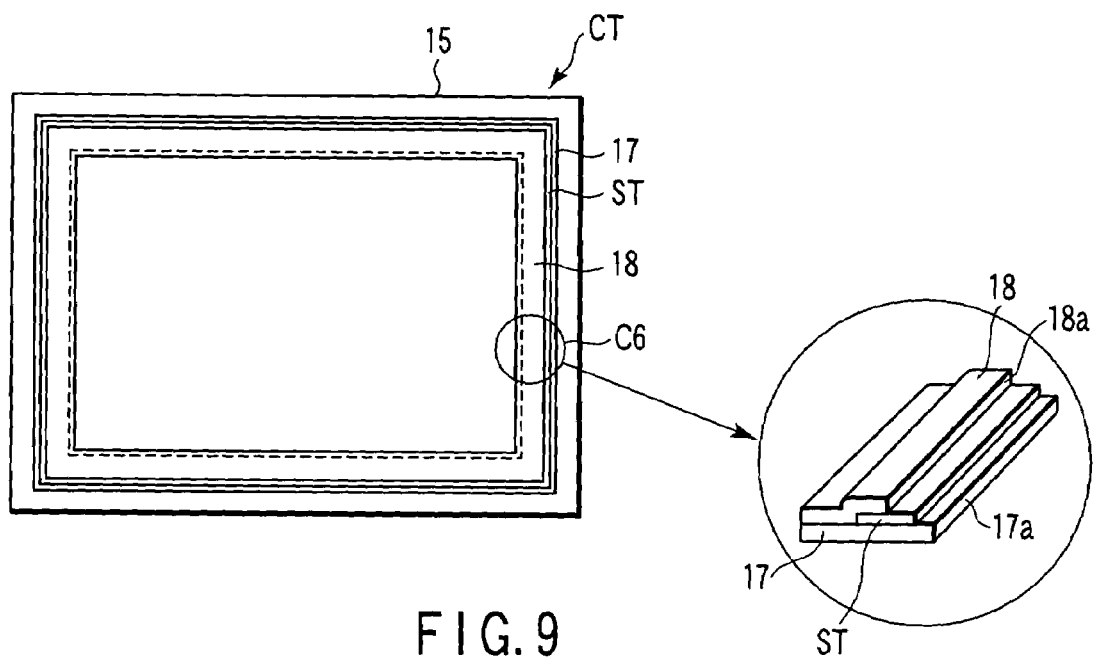
FIG. 9 shows the planar structure of a counter substrate incorporated into an OCB-mode liquid crystal display panel according to a second embodiment of the present invention.

FIG. 9 shows the planar structure of the counter substrate CT of the OCB mode liquid crystal display panel 11. In FIG. 9, a portion enclosed with a circle C6 is shown enlarged.

As in the first embodiment described with reference to FIGS. 1 and 2, the counter substrate CT of the liquid crystal display panel 11 includes a support base member 15 which is formed of a glass plate or the like and is nearly rectangular or square in shape, a color filter layer 16 formed on the support base member 15, a counter electrode 17 of ITO formed on the color filter layer 16, and an alignment film 18 formed on the counter electrode 17. The color filter layer 16 includes red-colored layers 16R for red pixels, green-colored layers 16G for green pixels, blue-colored layers 16B for blue pixels, and a black-colored layer 16BM for a black matrix.

With the counter substrate CT, the counter electrode 17 and the alignment film 18 have such planar shapes as shown in FIG. 9 and a step relief layer ST is provided in order to relieve the difference in height between the top of the counter electrode 17 and the top of the alignment film 18, that is, the step attributed to the thickness of the alignment film 18. The step relief layer ST is formed in, for example, a predetermined width along the edge 17a of the counter electrode 17 on the counter electrode 17 and covered with the alignment film 18 except a portion close to the edge of the counter electrode 17. That is, the edge of the step relief layer ST is located between the edge 17a of the counter electrode 17 and the edge 18a of the alignment film 18. The step relief layer ST is set smaller in thickness than the alignment film 18. The spacing between the edge 17a of the counter electrode 17 and the edge 18a of the alignment film 18, the position of the edge of the step relief layer ST and the thickness of the step relief layer ST are set on the basis of the material, thickness and length of the pile of the rubbing cloth BF to rub the alignment film 18 in a rubbing treatment using the rubbing roller RL shown in FIG. 15 so as to lighten the abrasion of the rubbing cloth BF occurring in the rubbing treatment and scatter pressure applied from the pile of the rubbing cloth BF to the edge of the alignment film 18 to cause the alignment film 18 to peel off.

The step relief layer ST is made of a material which is good in adhesion to the alignment film 18. That is, the strength with which the alignment film 18 and the step relief layer ST are bonded together is larger than the strength with which the alignment film 18 and the counter electrode 17 are bonded together. Therefore, the alignment film 18 is held by the step relief layer ST more tightly than in the case where the edge 18a of the alignment film 18 extending in the rubbing direction RD is provided on the counter electrode 17. As a result, it becomes more difficult for the rubbing roller RL to cause the alignment film 18 to peel off the step relief layer ST in the treatment of rubbing the alignment film 18. In FIG. 9, the edge 17a of the counter electrode 17, the edge 18a of the alignment film 18 and the edge of the step relief layer ST are each parallel to the side of the support base member 15 of a nearly rectangular or square shape; however, when regarding lightening of the pile abrasion as important, it is desirable to make at least the edges extending in the rubbing direction RD nonlinear as in the case of the first embodiment.

The step relief layer ST is comprised of an SiNx film by way of example. The SiNx film can be formed using the CVD method. When the alignment film 18 has a thickness of, say, about 80 nm, it is desirable to set the width and thickness of the step relief layer ST to 1.5 mm and about 30 to 50 nm, respectively, from the points of view of lightening of pile abrasion and scattering of pressure. When regarding the scattering of pressure as important, the thickness of the step relief layer ST may be set to, say, about 100 nm.

The step relief layer ST may be made of the material of the color filter layer 16 or the material of columnar spacers or the like which are integrated with the color filter layer 16.

With the liquid crystal display panel 11 of this embodiment, since the edge of the step relief layer ST is located between the edge 17a of the counter electrode 17 and the edge 18a of the alignment film 18, the step attributed to the thickness of the alignment film 18 is relieved. This allows the pile abrasion of the rubbing cloth BF to be lightened and the pressure applied from the pile to the edge 18a of the alignment film 18 to be scattered. Therefore, the occurrence of stripe-like defects of the alignment film 18 resulting from the pile abrasion and the peeling of the alignment film 18 can be suppressed to improve the uniformity of liquid crystal alignment and attain good display quality. Moreover, the alignment film 18 can be held more tightly by properly selecting the material of the step relief layer ST.

An OCB mode liquid crystal display panel according to a third embodiment of the present invention will be described next with reference to the accompanying drawings. This liquid crystal display panel remains unchanged in structure from the first embodiment except the structure of the counter substrate. For this reason, in FIG. 10 and the description which follows, corresponding elements are denoted by like reference numerals and detailed descriptions thereof are omitted or simplified.

Figure 10:
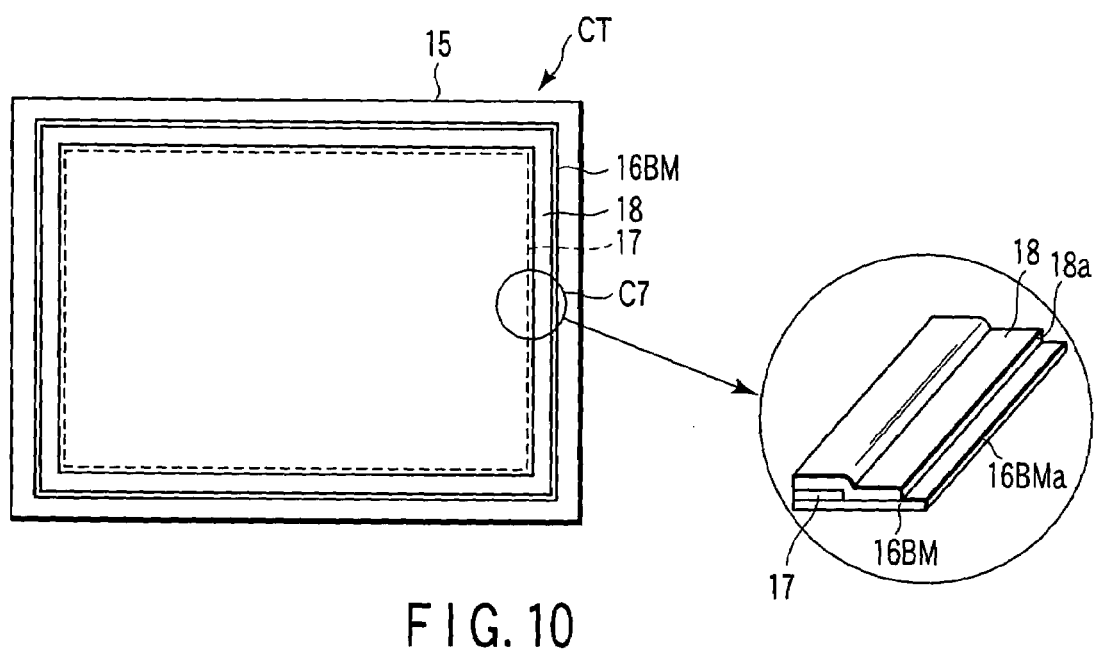
FIG. 10 shows the planar structure of a counter substrate incorporated into an OCB-mode liquid crystal display panel according to a third embodiment of the present invention.

FIG. 10 shows the planar structure of the counter substrate CT of the OCB mode liquid crystal display panel 11. In FIG. 10, a portion enclosed with a circle C7 is shown enlarged.

As in the first embodiment described with reference to FIGS. 1 and 2, the counter substrate CT of the liquid crystal display panel 11 includes a support base member 15 which is formed of a glass plate or the like and is nearly rectangular or square in shape, a color filter layer 16 formed on the support base member 15, a counter electrode 17 of ITO formed on the color filter layer 16, and an alignment film 18 formed on the counter electrode 17. The color filter layer 16 includes red-colored layers 16R for red pixels, green-colored layers 16G for green pixels, blue-colored layers 16B for blue pixels, and a black-colored layers 16BM for a black matrix.

With the counter substrate CT, the counter electrode 17 and the alignment film 18 have such planar shapes as shown in FIG. 10, the counter electrode 17 is located inside the black-colored layer 16BM of the color filter layer 16 underlying the counter electrode 17, and the alignment film 18 is formed not only on the counter electrode 17 but also on the black-colored layer 16BM. The black-colored layer 16BM serves as a step relief layer which relieves the difference in height between the top of the counter electrode 17 and the top of the alignment film 18, that is, the step attributed to the thickness of the alignment film 18. The black-colored layer 16BM has an edge 16BMa, and is formed in, for example, a predetermined width along the edge of the support base member 15 on the base member 15 and covered with the alignment film 18 except a portion close to the edge of the support base member 15. That is, the edge 16BMa of the black-colored layer 16BM is located between the edge of the support base member 15 and the edge 18a of the alignment film 18. The black-colored layer 16BM is set smaller in thickness than the alignment film 18. The spacing between the edge of the support base member 15 and the edge 18a of the alignment film 18, the position of the edge 16BMa of the black-colored layer 16BM and the thickness of the black-colored layer 16BM are set on the basis of the material, thickness and length of the pile of the rubbing cloth BF to rub the alignment film 18 in a rubbing treatment using the rubbing roller RL shown in FIG. 15 so as to lighten the pile abrasion of the rubbing cloth BF and scatter pressure applied to the edge of the alignment film 18 to cause the alignment film 18 to peel off.

The black-colored layer 16BM is made of a material which is good in adhesion to the alignment film 18. That is, the strength with which the alignment film 18 and the black-colored layer 16BM are bonded together is larger than the strength with which the alignment film 18 and the counter electrode 17 are bonded together. Therefore, the alignment film 18 is held by the black-colored layer 16BM more tightly than in the case where the edge 18a of the alignment film 18 extending in the rubbing direction RD is provided on the counter electrode 17. As a result, it becomes more difficult for the rubbing roller RL to cause the alignment film 18 to peel off the black-colored layer 16BM (step relief layer) in the treatment of rubbing the alignment film 18. In FIG. 10, the edge 18a of the alignment film 18 and the edge 16BMa of the black-colored layer 16BM are each parallel to the side of the support base member 15 of a nearly rectangular or square shape; however, when regarding lightening of the pile abrasion as important, it is desirable to make at least the edges extending in the rubbing direction RD nonlinear as in the case of the first embodiment.

From the point of view of adhesion, it is desirable that the black-colored layer 16BM for a black matrix be made of a light-shielding resin material, for example, an acrylic resin and carbon. If the black-colored layer 16BM were made of Cr, the exposed end surface of the black-colored layer 16BM in the aforementioned structure would suffer corrosion.

With the liquid crystal display panel 11 of this embodiment, since the edge 16BMa of the black-colored layer 16BM is located between the edge of the support base member 15 and the edge 18a of the alignment film 18, the step attributed to the thickness of the alignment film 18 is relieved. This allows the pile abrasion of the rubbing cloth BF to be lightened and the pressure applied from the pile to the edge 18a of the alignment film 18 to be scattered. Therefore, the occurrence of stripe-like defects of the alignment film 18 resulting from the pile abrasion and the peeling of the alignment film 18 can be suppressed to improve the uniformity in liquid crystal alignment and attain good display quality. Moreover, the alignment film 18 can be held more tightly by properly selecting the material of the black-colored layer 16BM.

In the second and third embodiments as well, it is desirable to make at least the edges of the alignment film 18 extending in the rubbing direction RD nonlinear as in the case of the first embodiment.

The planar shape of the alignment film 18 shown in FIGS. 9 and 10 may be modified as shown in FIGS. 11 through 14. Moreover, the sides ab and cd of the planar shapes shown in FIGS. 11 through 14 may be applied to the edge 17a of the counter electrode 17 extending in the rubbing direction RD and the edge of the step relief layer ST extending in the rubbing direction RD which are shown in FIG. 9 and the edge 16BMa of the black-colored layer 16BM extending in the rubbing direction RD which is shown in FIG. 10.

Figure 11:
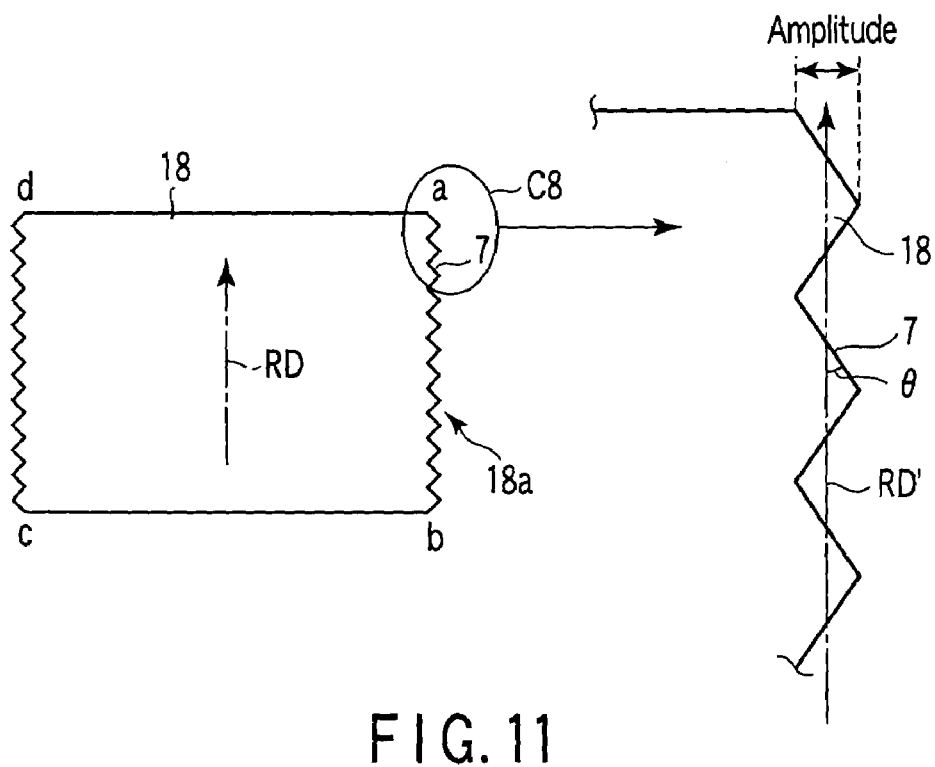
FIG. 11 shows a first modification of the planar shape of the alignment film shown in FIGS. 9 and 10.

FIG. 11 shows a first modification of the planar shape of the alignment film 18. The sides ab and cd of the alignment film 18 extend in the rubbing direction RD and the sides ad and bc extend in a direction perpendicular to the rubbing direction RD. Thus, the sides ab and cd correspond to the edge 18a shown in FIG. 9 or 10.

The edge 18a of the alignment film 18 has a bending shape as a set of linear partial edges 7 nonparallel to the rubbing direction RD. These linear partial edges 7 are arranged continuously so that adjacent partial edges make opposite angles with the axis RD' parallel to the rubbing axis RD. In FIG. 11, that portion of the edge 18a which is enclosed by a circle C8 is shown enlarged. The pitch of the linear partial edges 7 is 1 to 5 mm. The absolute value of the angle θ each of the linear partial edges 7 makes with the axis RD' parallel to the rubbing direction RD should preferably be set to a range of 5 to 75°, more preferably to a range of 10 to 60°, and even more preferably to a range of 15 to 45°. Examination of practical angles for θ showed that approximately 30° was optimum. The angle θ does not necessarily need to be the same for all the partial edges 7.

Figure 12:
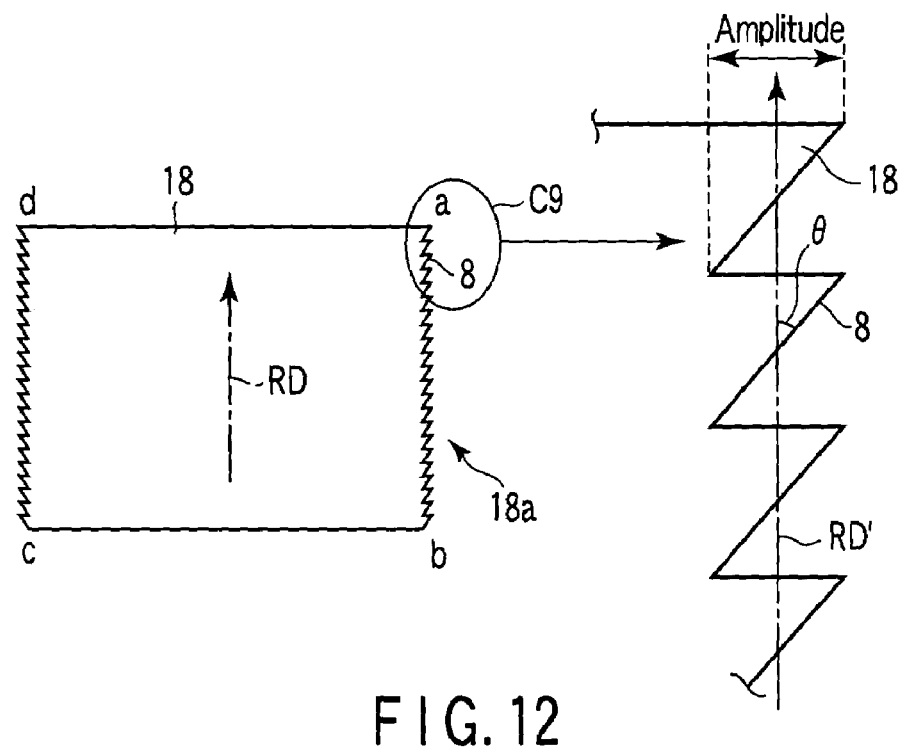
FIG. 12 shows a second modification of the planar shape of the alignment film shown in FIGS. 9 and 10.

FIG. 12 shows a third modification of the planar shape of the alignment film 18. The edge 18a of the alignment film 18 has a saw-tooth shape as an aggregate of saw-tooth partial edges 8 nonparallel to the rubbing direction RD. In FIG. 12, that portion of the edge 18a of the alignment film 18 which is enclosed by a circle C9 is shown enlarged. The absolute value of the angle θ each of the saw-toothed partial edges 8 makes with the axis RD' parallel to the rubbing direction RD should preferably be set, as in the first modification, to a range of 5 to 75°, more preferably to a range of 10 to 60°, and even more preferably to a range of 15 to 45°. Examination of practical angles for θ showed that approximately 30° was optimum. The angle θ does not necessarily need to be the same for all the partial edges 8.

Figure 13:
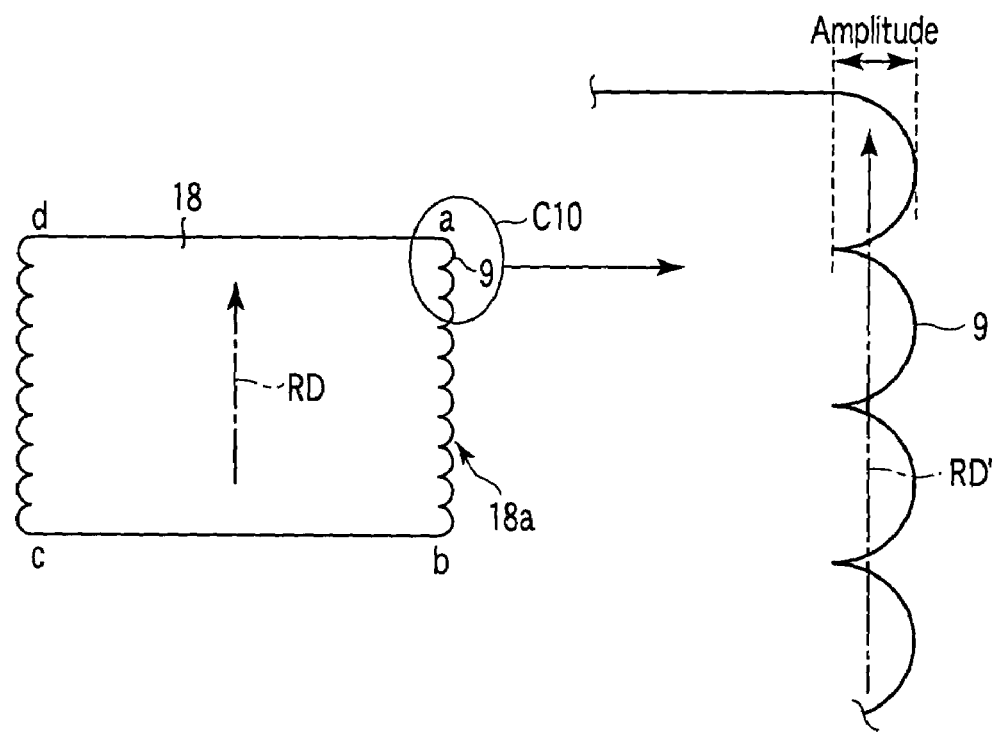
FIG. 13 shows a third modification of the planar shape of the alignment film shown in FIGS. 9 and 10.

FIG. 13 shows a third modification of the planar shape of the alignment film 18. The edge 19a of the alignment film 18 has a saw-tooth shape as a set of semi-circle-like partial edges 9 nonparallel to the rubbing direction RD. The semi-circle-like partial edges 9 are continuously arranged so that they are oriented in the same direction with respect to the axis RD' parallel to the rubbing direction RD. In FIG. 13, that portion of the edge 18a of the alignment film 18 which is enclosed by a circle C10 is shown enlarged.

Figure 14:
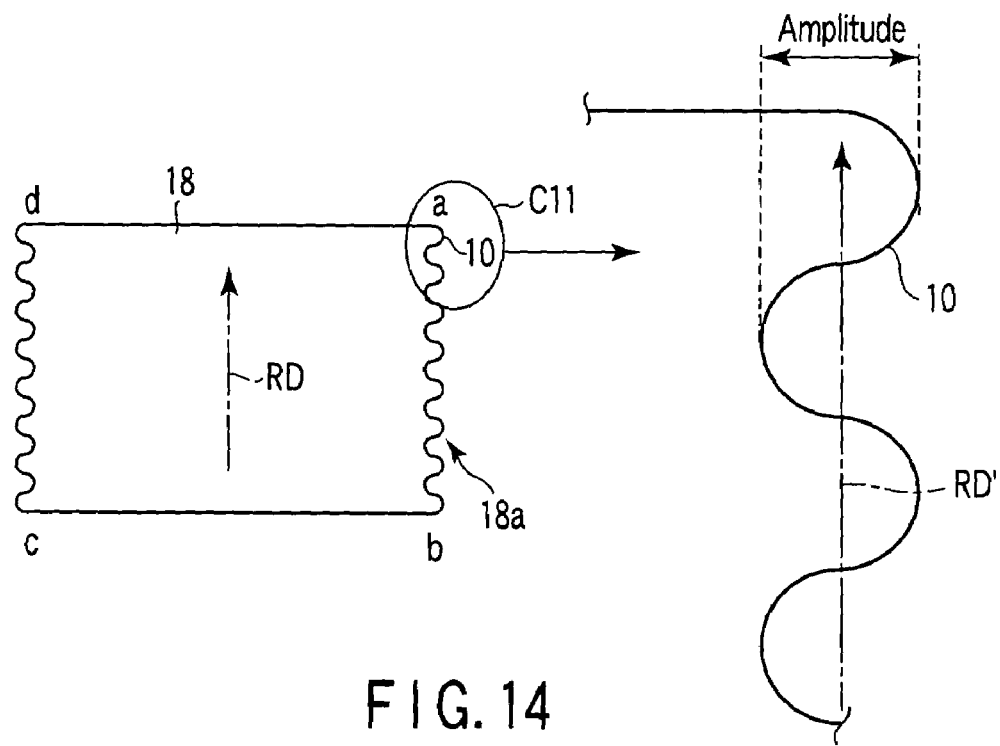
FIG. 14 shows a fourth modification of the planar shape of the alignment film shown in FIGS. 9 and 10.

FIG. 14 shows a fourth modification of the planar shape of the alignment film 18. The edge 18a of the alignment film 18 has a wave-like shape as a set of semi-circle-like partial edges 10 nonparallel to the rubbing direction RD. The semicircle-like partial edges 10 are continuously arranged so that adjacent partial edges are oriented in the opposite directions with respect to the axis RD' parallel to the rubbing axis RD. In FIG. 14, that portion of the edge 18a of the alignment film 18 which is enclosed by a circle C11 is shown enlarged.

The alignment film 18, the counter electrode 17, the step relief layer ST and the black-colored layer 16BM may each have not only the planar shapes shown in FIGS. 9 to 14 but also edges of a sinusoidal or semi-oval shape extending in the rubbing direction RD. In addition, they may have edges of a mixed shape of a bending shape and a saw-tooth shape extending in the rubbing direction RD.

The amplitudes of the edge 17a of the counter electrode 17, the edge 18a of the alignment film 18, the edge of the step relief layer ST and the edge 16BM of the black-colored layer 16BM, i.e., the width in a direction perpendicular to the axis RD', should be set to 0.2 mm or more, preferably to 0.5 mm or more, and more preferably to 0.8 mm or more. The thickness of the alignment film 18 should be set to less than 200 nm, preferably to less than 150 nm, and more preferably to less than 100 nm.

Further, the structures of the second and third embodiments, which are particularly effective in reducing the display nonuniformity which is liable to occur in an LCD mode having a high pretilt angle of 5° or more like the OCB mode liquid crystal display panel 11, can also be applied to other LCD modes requiring the rubbing treatment, for example, IPS liquid crystal display panels, ferroelectric liquid crystal display panels and anti-ferroelectric liquid crystal display panels, in which case the effect of reducing the display nonuniformity can be obtained correspondingly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The present invention suppresses the occurrence of stripe-like defects of the alignment film caused by a rubbing treatment to allow the uniformity in alignment of liquid crystals to be increased and is therefore suitable for the manufacture of various liquid crystal display panels.

What is claimed is:

1. A liquid crystal display panel, comprising:
    an array substrate;
    a counter substrate; and
    a liquid crystal layer held between the array substrate and the counter substrate,
    wherein
    the counter substrate includes a support member, a counter electrode supported by the support member, and an alignment film located between a surface of the counter electrode and the liquid crystal layer,
    a rubbing direction of the alignment film is parallel to one side of the support member, and
    the alignment film has a continuous nonlinear edge displaced back from an edge of the counter electrode and extending in the rubbing direction of the alignment film.

2. The liquid crystal display panel according to claim 1, wherein the counter electrode has a nonlinear edge extending in the rubbing direction of the alignment film.

3. The liquid crystal display panel according to claim 1, wherein the nonlinear edge includes an aggregation of partial edges nonparallel to the rubbing direction.

4. The liquid crystal display panel according to claim 3, wherein the aggregation of partial edges forms one of a bending shape, a saw-tooth shape, a mixed shape of the bending shape and the saw-tooth shape, and a wave-like shape.

5. The liquid crystal display panel according to claim 4, wherein the partial edges are arranged continuously at a pitch of 1 to 5 mm.

6. The liquid crystal display panel according to claim 5, wherein the partial edges make an angle of 10 to 45° with an axis parallel to the rubbing direction.

7. The liquid crystal display panel according to claim 6, wherein the partial edges make an angle of 25 to 35° with an axis parallel to the rubbing direction.

8. The liquid crystal display panel according to claim 1, wherein the liquid crystal layer contains liquid crystal molecules set to a pretilt of 5° or more by the alignment film.

9. The liquid crystal display panel according to claim 8, wherein the liquid crystal molecules are controlled to an alignment for an OCB mode.

10. A liquid crystal display panel1 comprising:
an array substrate;
a counter substrate; and
a liquid crystal layer held between the array substrate and the counter substrate;
wherein
the counter substrate has a support member, a counter electrode supported by the support member, and an alignment film located between a surface of the counter electrode and the liquid crystal layer,
a rubbing direction of the alignment film is parallel to one side of the support member,
the counter electrode has a continuous nonlinear edge extending in the rubbing direction of the alignment film, and
the alignment film is displaced back from the continuous nonlinear edge of the counter electrode.

11. The liquid crystal display panel according to claim 10, wherein the alignment film has a nonlinear edge extending in the rubbing direction of the alignment film.

12. The liquid crystal display panel according to claim 10, wherein the nonlinear edge comprises an aggregation of partial edges nonparallel to the rubbing direction.

13. The liquid crystal display panel according to claim 12, wherein the aggregation of partial edges forms one of a bending shape, a saw-tooth shape, a mixed-shape of the bending shape and the saw-tooth shape, and a wave-like shape.

14. The liquid crystal display panel according to claim 13, wherein the partial edges are arranged continuously at a pitch of 1 to 5 mm.

15. The liquid crystal display panel according to claim 14, wherein the partial edges make an angle of 10 to 45° with an axis parallel to the rubbing direction.

16. The liquid crystal display panel according to claim 15, wherein the partial edges make an angle of 25 to 35° with an axis parallel to the rubbing direction.

17. The liquid crystal display panel according to claim 10, wherein the liquid crystal layer contains liquid crystal molecules set to a pretilt of 5° or more by the alignment film.

18. The liquid crystal display panel according to claim 17, wherein the liquid crystal molecules are controlled to an alignment for an OCB mode.

19. A liquid crystal display panel, comprising:
an array substrate;
a counter substrate; and
a liquid crystal layer held between the array substrate and the counter substrate,
wherein
the counter substrate has a support member, a counter electrode supported by the support member, and an alignment film located between a surface of the counter electrode and the liquid crystal layer,
a rubbing direction of the alignment film is parallel to one side of the support member, p1 the alignment film and the counter electrode have continuous nonlinear edges extending in the rubbing direction of the alignment film, and
the continuous edge of the alignment film is displaced back from the continuous nonlinear edge of the counter electrode.

20. The liquid crystal display panel according to claim 19, wherein one of the nonlinear edges comprises an aggregation of partial edges nonparallel to the rubbing direction.

21. The liquid crystal display panel according to claim 20, wherein the aggregation of partial edges forms one of a bending shape, a saw-tooth shape, a mixed shape of the bending shape and the saw-tooth shape, and a wave-like shape.

22. The liquid crystal display panel according to claim 20, wherein the partial edges are arranged continuously at a pitch of 1 to 5 mm.

23. The liquid crystal display panel according to claim 19, wherein the partial edges make an angle of 10 to 45° with an axis parallel to the rubbing direction.

24. The liquid crystal display panel according to claim 23, wherein the partial edges make an angle of 25 to 35° with an axis parallel to the rubbing direction.

25. The liquid crystal display panel according to claim 23, wherein the liquid crystal layer contains liquid crystal molecules set to a pretilt of 5° or more by the alignment film.

26. The liquid crystal display panel according to claim 25, wherein the liquid crystal molecules are controlled to an alignment for an OCB mode.

* * * * *